Sept. 22, 1931.  A. C. BADGER  1,824,422
GUIDED EXPANSION JOINT
Filed June 24, 1925
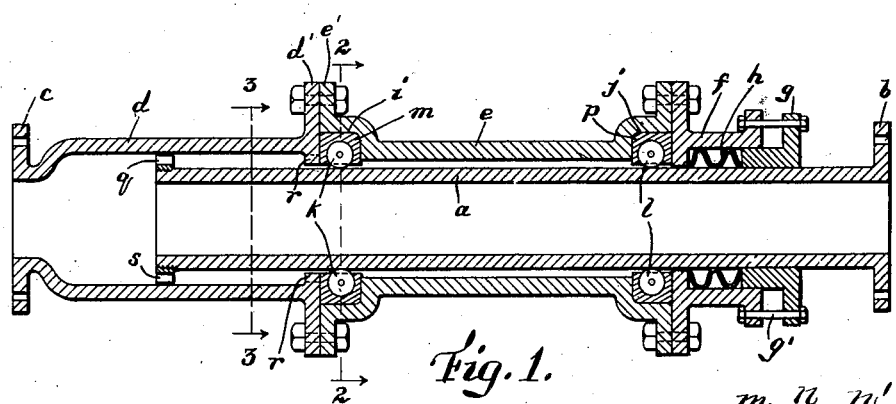
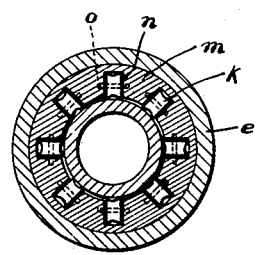
Fig. 2.
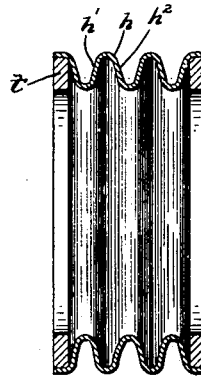
Fig. 4.
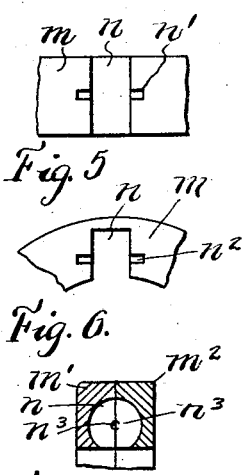
Fig. 5.
Fig. 6.
Fig. 7
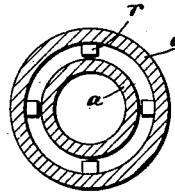
Fig. 3.
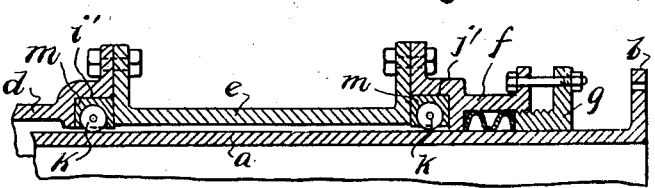
Fig. 8
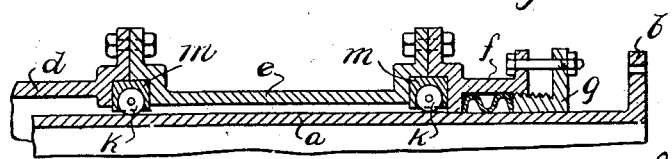
Fig. 9
Inventor
Arthur C. Badger
by Wright, Brown, Quinby & Hay
Attys.

Patented Sept. 22, 1931

1,824,422

UNITED STATES PATENT OFFICE

ARTHUR C. BADGER, OF NEWTON, MASSACHUSETTS

GUIDED EXPANSION JOINT

Application filed June 24, 1925. Serial No. 39,206.

The present invention relates to expansion joints for steam lines and other lines of piping which are subject to expansion and contraction in length due to temperature changes or other causes. More particularly it is concerned with that type of joint having telescopically arranged parts which are adapted to slip lengthwise, one within the other. The purpose of the invention is to enable the parts of such joints to move with respect to one another more readily and with less resistance than heretofore, to maintain the alinement of the parts accurately whether expanded or contracted, to diminish the wear of the relatively movable parts, and to enable the joint between the parts to be packed with greater security against leakage than heretofore and with greatly reduced wear and derangement of the packing, and, consequently, greatly diminished need of attention and renewal to maintain the leakage-tight condition.

These purposes and objects are accomplished by the novel and improved constructions described in the following specification, in which and in the principles embodied therein, the present invention consists.

In the drawings,—

Figure 1 represents a longitudinal section of a telescopic expansion joint illustrating the principles of the invention and embodying one of the specific forms thereof.

Figures 2 and 3 are cross sections of the joint taken on lines 2—2 and 3—3 of Figure 1, respectively.

Figure 4 is a detail view on an enlarged scale showing in axial section the new type of packing which is one of the features or characteristics of the invention.

Figures 5, 6 and 7 are fragmentary detail views of the anti-friction roller support showing alternative modes of mounting the rollers therein;

Figures 8 and 9 are fragmentary sectional detail views of the joint illustrating alternative modes of mounting the roll holding means therein.

Like reference characters designate the same parts wherever they occur in all the figures.

The parts of the joint comprise an inner part or pipe section $a$, having a flange $b$ on its outer end, or equivalent coupling means, for making connection with the adjacent end of a pipe line; and an outer part or housing having on its end opposite to the flange $b$ a similar flange or coupling $c$ for making connection with another part of the pipe line. The outer part or housing is composed of two members, namely, an end member $d$ carrying the flange $c$ and a sleeve $e$. The member $d$ and sleeve $e$ have flanges $d'$ and $e'$, respectively, adapted to be abutted and bolted together, with a gasket or any other suitable provisions for preventing leakage. Similarly attached to the opposite end of the sleeve $e$ is a stuffing box $f$ having a gland $g$ and containing packing $h$. The gland is here shown as of the type which slides in the open end of the stuffing box and is forced thereinto and adjusted by bolts $g'$ passing through adjacent flanges on the gland and stuffing box, for compressing the packing, but any other suitable means may be used for securing the gland. Likewise other suitable coupling means than flanges may be provided to secure the members $d$, $e$ and $f$ together.

In the opposite ends of the sleeve $e$ are formed annular recesses $i$ and $j$ in which are mounted anti-friction rollers $k$, $l$, respectively, for supporting and aligning the inner part $a$ of the joint. The rollers $k$ are rotatably mounted in a ring $m$ which fits the socket $i$ and is retained therein by the end of the terminal housing member $d$.

A convenient disposition and means of mounting the rollers in said ring is shown in the sectional view, Figure 2. Preferably the ring is formed with radial notches $n$ extending outward from its inner periphery of large enough length and width to receive the rolls and permit them to turn freely. The roll trunnions or pivots $o$ are supported in the parts of the ring which flank these notches. The parts which I have just described as pivots or trunnions $o$ may be pivot pins separate from the rollers and embedded in the ring and on which the rollers may be rotated, or they may be trunnions fast to the rollers and occupying bearings in the ring.

Various means or expedients for admitting and retaining the pivots or trunnions in the ring may be made use of. For instance, I may make slots $n'$ in either or both faces of each notch $n$ extending either from the inner circumference of the ring, as shown in Fig. 5, or slots $n^2$ from an end face thereof, as in Fig. 6, in which the pivots or trunnions may be placed, and in which they may afterwards be secured or not as desired, or the ring may be made of separable sections $m'$ and $m^2$, each containing half of each notch $n$ and half of sockets $n^3$ suitably placed to form trunnion bearings or to receive the ends of pivot rods, the sections of the ring being arranged, when assembled, to hold the rollers in place and permit their free rotation, as shown in Fig. 7. Also where the dimensions of the joint are large enough, I may equip the rollers with ball or roller bearings of well known character to diminish friction. I mention these expedients as illustrative of operative modes of mounting rollers in their supporting rings, but without intent to limit my protection to any particular details of construction and with reservation of the right to use and protect, within the scope of my claims, all operative means of mounting anti-friction rolls in a structure of the kind described.

In a similar manner the rolls $l$ are mounted in a ring $p$ which fits the socket $j$ in the sleeve $e$ and is retained by the adjacent stuffing box $f$.

Instead of forming the mountings for the roll-holding rings $m$ and $p$ in the sleeve $e$, they may be provided in the end member $d$ or stuffing box $f$, respectively, as shown in Fig. 8, or clamped between these adjacent members without being inserted into either of them, as in Fig. 9. The important fact in principle is that I have provided supports for the inner part of the expansion joint, which are preferably equipped with anti-friction rollers, but whether so equipped or not, are supported in longitudinally separated zones in the outer part of the joint, in a manner permitting operative assemblage of the several parts and members and with a wide enough separation between the supports to aline and guide the parts of the joint relatively to one another, without liability of cramping and without wearing of the parts on one another as they slide.

Accidental withdrawal of the inner part from the outer part or housing is prevented by an abutment ring $q$ on the inner end of the inner part, which is mounted thereon in a detachable manner so that it may be applied after the roller supports have been slipped over the inner part. Complemental abutment lugs $r$ are shown in these drawings as projecting inwardly from the member $d$. In that case in order that the abutment ring may be passed within the member $d$, it is provided with notches $s$ complemental to the lugs $r$, and when the parts have been assembled they are given a partial rotation before being coupled to the pipe line, so as to bring the notches $s$ out of alinement with the lugs $r$. But these lugs may be omitted and the roll holding ring $m$ depended on as the stop; and then, the ring $q$ may be made continuous, without the notches $s$.

I have devised a new form of packing for this expansion joint and have shown the same in detail in Figure 4. It is essentially a section of corrugated tubing made of material which is sufficiently stiff to hold its shape under severe fluid pressure, but sufficiently flexible to bend and yield under mechanical pressure axially applied. The preferred material for this purpose is annealed copper. When this corrugated packing is compressed endwise the outside diameter of the outer corrugations is made greater, and the inner diameter of the inner corrugation is made smaller. The sides $h'$ and $h^2$ of the corrugations may be inclined or slanted, converging toward one another as they approach the outer bends, in order best to obtain this effect. The outer bends then bear on the surrounding walls of the stuffing box and the inner bends bear on the inner part of the joint, namely the pipe section $a$, with a pressure which is more or less resilient and yielding. By application of enough pressure through the gland the bends of the corrugated packing may be forced as closely as desired against the surfaces of the packed joint.

Thus I have provided a metallic packing which is at once expansible and contractile, and formed without openings, joints or seams through which fluid under pressure may leak. In order to sustain the end thrust thus applied the ends of the packing tube are equipped with reinforcing washers or rings $t$ and $u$, to which they are secured by soldering, brazing, or other suitable means.

In Figure 4 I have shown the packing sleeve as terminating at the outer bends which embrace the outer periphery of the reinforcing rings, but the sleeve may equally well be made to terminate at the inner bends and be there secured to the inner circumference of the reinforcing rings.

Additional packing, such as any of the usual forms of steam packing, may be used in connection with the corrugated sleeve, if desired.

Not only is the packing one of a sort which, when once conformed to the opposing surface of the packed joint, is less liable to wear and deterioration from the pressure and contact of steam and other fluids, but it is also protected from distortion, displacement and derangement, by the guide rolls $k$ and $l$, which latter hold the parts of the joint in their necessary alinement and prevent that sort of side movement between the parts of the joint which might cause unequal wear or distortion at one side of the packing and open a space between the inner part and the packing at the opposite side through which fluid might leak. The cause of leakage heretofore has been the movement of the inner part in the packing, distorting or wearing the packing.

Thus it will be seen that I have provided an expansion joint of which the relatively movable parts are adapted to move with the minimum of frictional resistance and, therefore, readily and at once when forces act on the pipe line tending to expand it or contract it; in which the relatively movable parts are adequately supported at widely separated zones in a manner to remove all rubbing friction and wear between said parts; that the only wear is that which takes place between the rollers and their pivots or trunnion bearings; that renewals of the anti-friction rollers when worn out may be easily effected by disassembling the joint and substituting new roller assemblages at much less expense than would be caused by the renewal of a worn out joint; and that the means for supporting the parts of the joint and the character of the packing enable the latter to exist without need of renewal or even of attention for long periods of time.

What I claim and desire to secure by Letters Patent is:

1. An expansion joint comprising inner and outer relatively movable parts, a stuffing box on the outer part through which the inner part extends, and anti-friction supporting means between said parts arranged to hold them in a given alinement with the packing of said stuffing box.

2. An expansion joint comprising an inner part and an outer part or housing telescopically arranged, said outer part consisting of an end member, a sleeve and a stuffing box in series, and having removable supports for the inner part confined between the opposite ends of the sleeve and the end member and stuffing box, respectively.

3. An expansion joint comprising telescopically arranged inner and outer parts, the outer part consisting of a series of detachably connected members, roller holders confined between adjacent parts of said members and anti-friction rollers mounted in said holders and engaging the inner part at opposite sides thereof to support and guide said inner part substantially out of contact with the outer part, the inner part and one of the members of the outer part having complemental abutments to prevent accidental withdrawal of the inner part.

4. An expansion joint comprising telescopically arranged inner and outer parts, the outer part consisting of a series of detachably connected members, roller holders confined between adjacent parts of said members and anti-friction rollers mounted in said holders and engaging the inner part at opposite sides thereof to support and guide said inner part substantially out of contact with the outer part, the inner part and one of the members of the outer part having complemental abutments to prevent accidental withdrawal of the inner part, the abutment on one of said parts having a space complemental to the abutment on the other part, whereby to permit separation of the parts when said space is brought to register with said abutment.

5. An expansion joint comprising an outer part or housing having a stuffing box at one end, an inner part telescopically arranged within said outer part and projecting through said stuffing box, anti-friction guiding means mounted in the outer part and engaging axially separated zones of the inner part for guiding and alining the latter, and a packing in said stuffing box comprising a section of corrugated tubing made of sufficiently flexible material to be enlarged in diameter at its outer bends and contracted in diameter at its inner bends by axial pressure.

6. An expansion joint comprising an outer part or housing having a stuffing box at one end, an inner part telescopically arranged within said outer part and projecting through said stuffing box, axially separated guiding means within said outer part engaging and supporting the inner part at separated points and holding the latter in a given alinement, and packing in said stuffing box consisting of flexible corrugated tubing having circumferentially extending bends with inclined connecting walls so arranged that by axial compression of the packing the outer bends are forced outward and the inner bends are contracted in diameter.

7. A telescopic expansion joint for pipe lines comprising an inner part having a through passage and means at its outer end for connection with a pipe, an outer part or housing from which said inner part projects at one end, said outer part having means at its opposite end for connection with a pipe, a stuffing box between said parts, and detachable guides additional to the stuffing box mounted in the outer part in axially separated zones and constructed to engage and support the inner part substantially out of contact with the housing.

In testimony whereof I have affixed my signature.

ARTHUR C. BADGER.